(12) United States Patent
Mourad et al.

(10) Patent No.: US 7,835,473 B2
(45) Date of Patent: Nov. 16, 2010

(54) METHOD OF DETERMINING A METRIC FOR EVALUATING THE TRANSMISSION QUALITY OF A DATA FRAME TRANSMITTING BY A COMMUNICATION SYSTEM

(75) Inventors: Abdel-Majid Mourad, Cesson-Sevigne (FR); Arnaud Gueguen, Rennes Cedex (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 975 days.

(21) Appl. No.: 11/288,111

(22) Filed: Nov. 29, 2005

(65) Prior Publication Data

US 2006/0146946 A1 Jul. 6, 2006

(30) Foreign Application Priority Data

Dec. 20, 2004 (EP) .................................... 04293044

(51) Int. Cl.
*H04L 27/06* (2006.01)
(52) U.S. Cl. ....................... 375/341; 375/316; 375/324; 375/260
(58) Field of Classification Search ................. 375/341, 375/316, 324, 260; 262/261; 714/786, 794, 714/795
See application file for complete search history.

(56) References Cited

U.S. PATENT DOCUMENTS

| | | | |
|---|---|---|---|
| 5,732,113 A * | 3/1998 | Schmidl et al. ............. | 375/355 |
| 6,167,031 A | 12/2000 | Olofsson et al. | |
| 6,324,224 B1 * | 11/2001 | Ikeda ......................... | 375/341 |
| 6,327,316 B1 * | 12/2001 | Ikeda ......................... | 375/341 |
| 7,178,080 B2 * | 2/2007 | Hocevar ..................... | 714/752 |
| 7,260,055 B2 * | 8/2007 | Wang et al. ................. | 370/208 |
| 2002/0056066 A1 | 5/2002 | Gesbert et al. | |
| 2005/0069057 A1 * | 3/2005 | Krupka ....................... | 375/340 |

FOREIGN PATENT DOCUMENTS

GB 2 337 425 A 11/1999

OTHER PUBLICATIONS

Abdel-Majid Mourad, et al. "MAI Analysis for Forward Link Mono-Dimensionally Spread OFDM Systems", Vehicular Technology Conference, 2004, XP010766398, vol. 3, May 17, 2004, pp. 1528-1533.

* cited by examiner

*Primary Examiner*—Shuwang Liu
*Assistant Examiner*—Helene Tayong
(74) *Attorney, Agent, or Firm*—Oblon, Spivak, McClelland, Maier & Neustadt, L.L.P.

(57) ABSTRACT

A method of determining a metric for evaluating an error probability of a data frame includes receiving, at a radio receiving device, the data frame encoded according to a coding method and transmitted through a radio communication channel by a radio transmitting device. The data frame includes a plurality of symbols. The method also includes performing a channel equalization of the data frame received at the radio receiving device to produce a channel equalized data frame, performing a symbol de-mapping of symbols in the channel equalized data frame to produce a de-mapped data frame, obtaining soft bits based on the de-mapped data frame and characteristics of the coding method, and calculating the metric from at least one moment, having an order strictly greater than one, of quantities that characterize an equivalent communication channel for the soft bits.

13 Claims, 3 Drawing Sheets

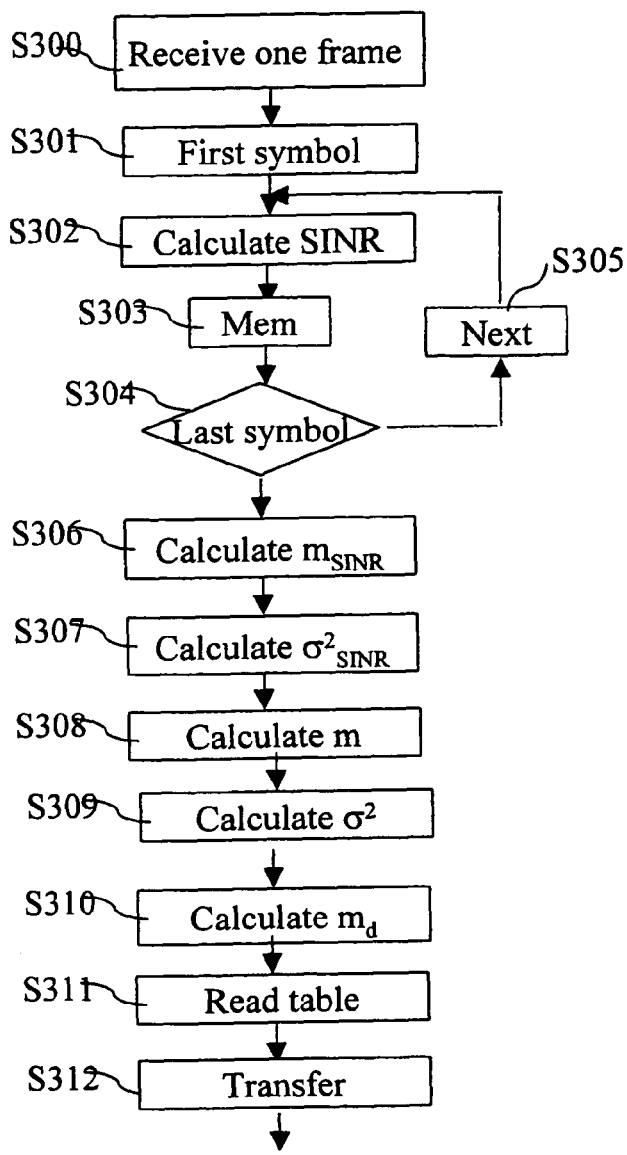
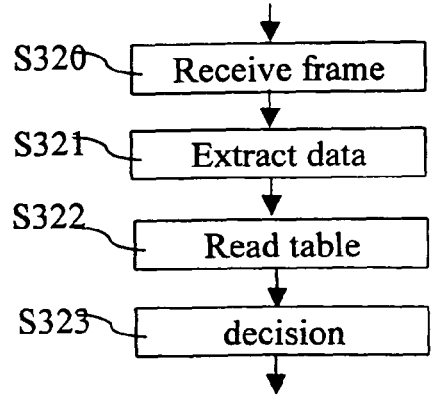
Fig. 2b
Fig. 2a

METHOD OF DETERMINING A METRIC FOR EVALUATING THE TRANSMISSION QUALITY OF A DATA FRAME TRANSMITTING BY A COMMUNICATION SYSTEM

BACKGROUND OF INVENTION

1. Field of the Invention

The present invention concerns a method of determining a metric for evaluating an error probability of a data frame transmitted by a first device to a second device through communication channels.

2. Discussion of the Background

In the telecommunication domain, especially in the domain of radio telecommunication, it is necessary to evaluate the quality of the transmission of data and to be able to adjust transmission parameters according to the evaluated quality of the transmission.

As example, the communication channels can be obstructed by houses and other obstacles located between the transmitter and the receiver. The transmitted signal is then propagated on multiple paths, each path being delayed and attenuated differently. When the transmitter or the receiver are mobile devices, the communication channels vary in time. The communication channels can then be considered as filters whose transfer functions vary with time. Furthermore, some perturbations like noise and interferences reduce the quality of the communication channels.

Such imperfect conditions of the communication channels generate some errors during the transmission of data frames.

Some techniques have been developed in order to make it possible to evaluate these errors. Classically, the quality of a communication channel is evaluated using measures like the probability of bit error or the probability of frame error. Such measures can not be made accurately and easily by devices which receive data frames because they don't know the real data transmitted within the frame.

Receivers can also evaluate the quality of the communication using Cyclic Redundancy Check. Such technique induces some latency due to the decoding, bandwidth cost and is not accurate.

Such measures can not be made simply and efficiently by devices which transmit data frames because they don't know the real data received by the receiver.

The aim of the invention is therefore to propose a method which makes it possible to evaluate an error probability of a data frame transmitted by a first device to a second device through communication channels and more particularly to find one determinable metric which permits to evaluate univocally the error probability on a transmitted data frame.

SUMMARY OF INVENTION

To that end, the present invention concerns a method of determining a metric for evaluating an error probability of a data frame transmitted by a first device to a second device through communication channels, a data frame comprising a plurality of symbols, characterised in that the metric is determined at least from at least one moment of an order strictly upper than one of quantities characterising the equivalent communication channels for a plurality of items of information obtained from symbols comprised in the data frame.

According to still another aspect, the present invention concerns a device for determining a metric for evaluating an error probability of a data frame transmitted by a first device to a second device through communication channels, a data frame comprising a plurality of symbols, characterised in that one of the devices comprises means for determining the metric at least from at least one moment of an order strictly upper than one of quantities characterising the equivalent communication channels for a plurality of items of information obtained from symbols comprised in the data frame.

Thus, it is then possible to evaluate the quality of the transmission of data frames.

The inventor found that by defining a metric at least from at least one moment of an order strictly upper than one of quantities characterising the equivalent communication channels for a plurality of symbols comprised in the data frame, we obtain a reliable metric which has a direct relationship with the error probability.

According to a particular feature, the items of information are soft bits obtained by the second device after a channel equalization of the received data frame and a symbol de-mapping of symbols comprised in the data frame.

According to a particular feature, the items of information are soft bits obtained by the second device after a channel equalization, a de-spreading of the received data frame and a symbol de-mapping of symbols comprised in the data frame.

The statistics of the quantities obtained after an equalization and a de-mapping of the received data frame or after an equalization, a de-spreading of the received data frame and a symbol de-mapping of symbols comprised in the data frame, summarize the characteristics of the transmission channel and the reception algorithms which both distort the transmitted signal.

Besides, including as much as possible the encountered distortions and filtering into the determination of the metric provides an advantageous property of invariance to the relationship between the metric and the error probability with respect to the system parameters such as the number of active users, the channels characteristics and so on.

Thanks to that property, there is no need for the link Adaptation algorithm or the Media Access Control layer to identify these system parameters. A single or at least a reduced number of Look Up Tables can be used in order to evaluate the error probability of a data frame.

The de-spreading takes place when the symbols are spread prior to the transmission of the data frame in order to mitigate the Multiple Access Interference in a CDMA based system.

According to a particular feature, the quantities characterising the equivalent communication channels for the plurality of items of information obtained from symbols comprised in the data frame are the signal to interference plus noise ratios of all soft bits obtained from all symbols comprised in the data frame.

Signal to interference plus noise ratios of all soft bits obtained from all symbols comprised in the data frame are often determined by devices receiving data frames, as example at the level of the physical layer in order to perform a soft input channel decoding. By using these data, it is not necessary to increase the complexity of the telecommunication devices. A Media Access Control layer can then use these data in order to determine the metric without important modifications of the receiving device.

The signal to interference plus noise ratios of each soft bits obtained from all symbols comprised in the data frame aim at characterizing the equivalent channels distorting the soft bits.

According to another particular feature, an equivalent channel comprises the OFDM modulation, the physical radio channel, the OFDM demodulation and the channel equalization if the modulation used for the transmission is an OFDM modulation and the first device and the second device use a respectively single antenna, or an equivalent channel comprises the space time and/or frequency coding, the OFDM modulation, the physical radio channel, the OFDM demodulation, the space time and/or frequency decoding as being the adapted channel equalization to coded Multiple Input Multiple Output transmission if the modulation used for the transmission is an OFDM modulation and if at least one of the devices has plural antennas.

By considering equivalent channels, the quantities obtained summarize the characteristics of the transmission channel and the transmission and reception algorithms which distort the transmitted signal.

Including as much as possible the encountered distortions and filtering into the determination of the metric provides an advantageous property of invariance to the relationship between the metric and the error probability with respect to the system parameters such as the number of active users, the channels characteristics and so on.

According to another particular feature, the mean of the signal to interference plus noise ratios is calculated, the variance of the signal to interference plus noise ratios, which is the at least one moment of an order strictly upper than one, is calculated and the metric is determined from the calculated mean and variance of the signal to interference plus noise ratios.

Thus, the determination of the metric is accurate. It is then possible to evaluate the error probability precisely.

According to another particular feature, intermediate values are calculated from the calculated mean and variance and characteristics of the coding method employed for the transmission of the data frame.

According to another particular feature, the metric is calculated from the intermediate values.

According to another particular feature, the error probability is evaluated by consulting a table comprising different error probability values respectively associated to values of the metric.

Thus, the evaluation of the error probability is simple. There is no need of multiple tables, the memory needed for the present invention is reduced.

According to another particular feature, the error probability is a probability of bit error for a channel realisation or a probability of frame error for a channel realisation.

According to another particular feature, the second device implements the cited features of the present invention and the second device transfers to the first device data comprising the evaluated error probability or the calculated metric or the intermediate parameters or the mean and the variance of obtained signal to interference plus noise ratio.

Thus it is then possible for the device which transmits data frame to decide whether or not any modification of the transmission parameters is necessary or not.

According to another particular feature, the method comprises the steps of:

determining a first intermediate value:

$$m = \left( d^2 \cdot m_{SINR}^2 - \frac{d}{2} \sigma_{SINR}^2 \right)^{1/4}$$

wherein $m_{SINR}$ is the mean of the Signal to Interference plus Noise Ratios (SINR) calculated for all soft bits obtained from all symbols of a data frame and $\sigma_{SINR}^2$ is the variance of all SINR calculated for all soft bits obtained from all symbols of a data frame, determining a second intermediate value:

$$\sigma^2 = d \cdot m_{SINR} - \sqrt{d^2 \cdot m_{SINR}^2 - d \cdot \sigma_{SINR}^2 / 2}$$

determining the metric:

$$m_d = \frac{m^2}{1+\sigma^2} + \log(1+\sigma^2).$$

BRIEF DESCRIPTION OF THE DRAWINGS

The characteristics of the invention will emerge more clearly from a reading of the following description of an example embodiment, the said description being produced with reference to the accompanying drawings, among which:

FIG. 2a is an algorithm executed by a mobile terminal for determining an error probability according to the present invention;

FIG. 2b is an algorithm executed by a base station for obtaining a metric and/or deciding any modification of the modulation and the coding according to the determined an error probability;

DESCRIPTION OF THE PREFERRED EMBODIMENTS

Figure 1A:
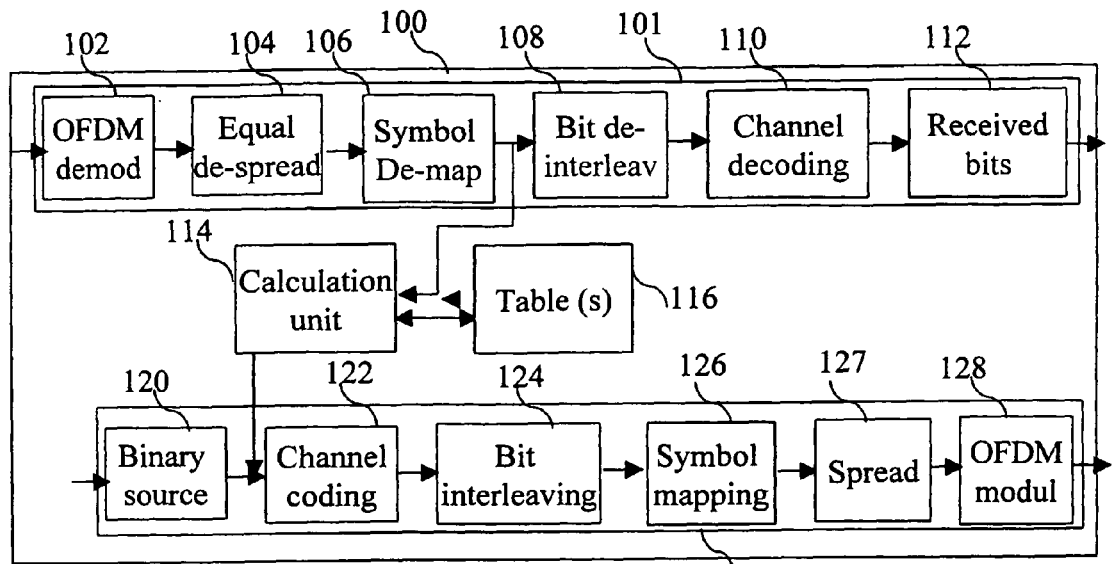
FIG. 1a is a block diagram of mobile terminal in a wireless communication system according to the present invention in a particular case where the modulation scheme is OFDM combined with CDMA as a multiple access scheme.

The present invention is particularly adapted for wireless local area networks, or cellular networks or multi-cell networks using radio communications channels as transmission medium. The present invention is particularly well adapted for communications using linear codes. As example, the present invention has applications for communications using Orthogonal Frequency Division Multiplex better known as OFDM or using the combination of OFDM and Frequency Division Multiple Access better known as FDMA, or using the combination of OFDM and Time Division Multiple Access better known as TDMA, or using the combination of OFDM and Code Division Multiple Access better known as CDMA or using the combination of OFDM and Multiple Input Multiple Output systems better known as MIMO.

The present invention considers equivalent channels instead of the physical channels themselves. An equivalent channel comprises the OFDM modulation, the physical radio channel, the OFDM demodulation and the channel equalization if the modulation used for the transmission is an OFDM modulation and the first device and the second device use a respectively single antenna. An equivalent channel comprises the space time and/or frequency coding, the OFDM modulation, the physical radio channel, the OFDM demodulation, the space time and/or frequency decoding as being the adapted channel equalization to coded Multiple Input Multiple Output transmission if the modulation used for the transmission is an OFDM modulation and if at least one of the devices has plural antennas.

The space time and/or frequency coding designates a coding scheme used for Multiple Input Multiple Output transmission in general. It can also designate in a non limitative way a coding scheme as disclosed in the paper of S. M. Alamouti entitled "A simple transmitter diversity scheme for wireless communications," published in IEEE J. Selected Areas in Communications, vol. 16, pp. 1451-1458, October 1998. It can also designate in a non limitative way a coding scheme like spatial multiplexing as disclosed in the paper of G. J. Foschini entitled "Layered Space-Time Architecture for Wireless Communication in a Fading Environment When Using Multiple Antennas" published in the Bell Labs Technical Journal, Vol. 1, No. 2, Autumn 1996, pp 41-59.

The present invention takes profits of one characteristic of linear codes, which makes it possible to define some bounds of the error probability for a channel realization noted H. For linear codes, the probability of bit error for a channel realization H noted $Peb_H$ is comprised within the following bounds:

$$P_2(d_f) < Peb_H < \sum_{d=d_f}^{\infty} C_d P_2(d)$$

Wherein $d_f$ and $C_d$ are characteristics of the coding technique being used, $d_f$ is the free distance of the code. The free distance $d_f$, written latter as d is the minimum Hamming distance between two codewords of the channel code under consideration. $P_2(d)$ is the pair wise error probability for code words separated by a distance d.

It has to be noted here that such formula can be used also for coding technologies like Turbo Codes. In such case, the free distance considered is the free distance of a Convolutional code which has a performance curve similar to the Turbo Code or offers the same diversity as in the so-called waterfall region of the Turbo Code. Indeed, Turbo Codes are also linear codes, but their performance in terms of error probability within the waterfall region are rather dictated by the overall weight distribution than by the free distance. Hence, the need to define an "equivalent free distance" bound such as it has been disclosed previously.

The inventors found that it is possible to find an efficient relationship between $P_2(d)$ and a metric obtained from all the SINR calculated for soft bits obtained from all symbols of a data frame.

In fact, inventors found that $P_2(d)$ can be approximated as follow:

$$P_2(d) \approx Q(\sqrt{m_d})$$

wherein $$Q(x) = \frac{1}{\sqrt{2\Pi}} \int_x^{\infty} e^{-t^2/2} dt$$

$$m_d = \frac{m^2}{1+\sigma^2} + \log(1+\sigma^2)$$

and $$m = \left(d^2 . m_{SINR}^2 - \frac{d}{2}\sigma_{SINR}^2\right)^{1/4}$$

$$\sigma^2 = d.m_{SINR} - \sqrt{d^2.m_{SINR}^2 - d.\sigma_{SINR}^2/2}$$

$m_{SINR}$ is the mean of the SINR calculated for all soft bits obtained from all symbols of a data frame and $\sigma_{SINR}^2$ is the variance of all SINR calculated for all soft bits obtained from all symbols of a data frame.

From that, it is then possible to determine the probability of bit error for a channel realisation H ($Peb_H$) using the calculated metric $m_d$ as the key of the look-up table. The probability of frame error for a channel realisation H ($Pef_H$) can also be determined in a similar way using another look-up table as the one shown in FIG. 3.

FIG. 1a is a block diagram of a mobile terminal in a wireless communication system according to the present invention in a particular case where the modulation scheme is OFDM combined with CDMA as a multiple access scheme.

The telecommunication device is a mobile terminal 100 which uses OFDM modulation and CDMA leading to an OFDM+CDMA combination type, which is called MC-CDMA. The mobile terminal can also implement the communication technologies mentioned above.

The mobile terminal 100 is in communication through a radio channel with a base station 150 which will be described in reference to FIG. 1b. The mobile terminal 100 comprises a reception unit 101, a transmission unit 121 and a calculation unit 114 linked with at least one Look Up Table 116 which memorizes a least one transfer function according to the invention.

The reception unit 101 comprises an OFDM demodulator 102, an equalization module 104, a symbol de-mapping unit 106, a bit de-interleaving unit 108, a channel decoding unit 110 which produce binary data 112 which are processed by the mobile terminal 100. In the present example, the equalization module 104 is also able to de-spread the symbols if they have been spread prior to the transmission of the data frame.

The OFDM demodulator 102, the equalization module 104, the symbol de-mapping unit 106, the bit de-interleaving unit 108 and the channel decoding unit 110 are classical, they will not be described anymore.

The transmission unit 121 comprises a channel coding unit 122, a bit interleaving unit 124, a symbol mapping unit 126, a spreading unit 127 and an OFDM modulator 128 which transform binary data 120 to be transmitted on the radio channels to a base station 150. The channel coding unit 122, the bit interleaving unit 124, the symbol mapping unit 126, the spreading unit 127 and the OFDM modulator 128 are classical, they will not be described anymore.

It has to be noted here that in some other examples of realisation, the transmission unit 121 doesn't include a spreading unit 127.

The mobile terminal 100 comprises a calculation unit 114. The calculation unit 114 has means for calculating metrics according to the algorithm as described in reference to FIG. 2a. The calculation unit 114 is composed of a processor and associated memory means. The processor and associated memory of the calculation unit are the same components as the ones used for controlling the Media Access Control layer of the transmission and/or reception protocol. The calculation unit 114 can be also a dedicated integrated circuit. In a preferred embodiment, the calculation unit is associated with at least one Look Up Table as disclosed in the FIG. 3 or as disclosed in FIG. 4. The calculation unit 114 comprises means for determining the metric at least from at least one moment of an order strictly upper than one of quantities characterising the equivalent communication channels of items of information obtained from symbols comprised in the data frame. The items of information are soft bits obtained by the second device after a channel equalization of the received data frame and a symbol de-mapping of symbols comprised in the data frame. In the present example, the equalization module 104 is also able to de-spread the symbols if they have been spread prior to the transmission of the data frame.

More precisely, the quantities characterising the equivalent communication channels for a plurality of symbols comprised in the data frame are the signal to interference plus noise ratios of all soft bits obtained from all symbols comprised in the data frame. The calculation unit 114 comprises means for calculating the mean of the signal to interference plus noise ratios, for calculating the variance of the signal to interference plus noise ratios of all soft bits obtained from all symbols comprised in the data frame which is the at least one moment of an order strictly upper than one. More precisely, the means for determining the metric determine the metric from the calculated mean and variance of the signal to interference plus noise ratios. The calculation unit 114 comprises also means for calculating intermediate values from the calculated mean, the calculated variance and characteristics of the coding method employed for the transmission of the data frame. More precisely, the means for determining the metric determine the metric from the intermediate values.

In a variant of realization, the calculation unit 114 is not linked to a Look-Up Table 116. The calculation unit 114, in such mode of realization, is able to transfer to the base station 150 the calculated metric or the intermediate parameters or the mean and the variance of obtained signal to interference plus noise ratios.

Figure 3:
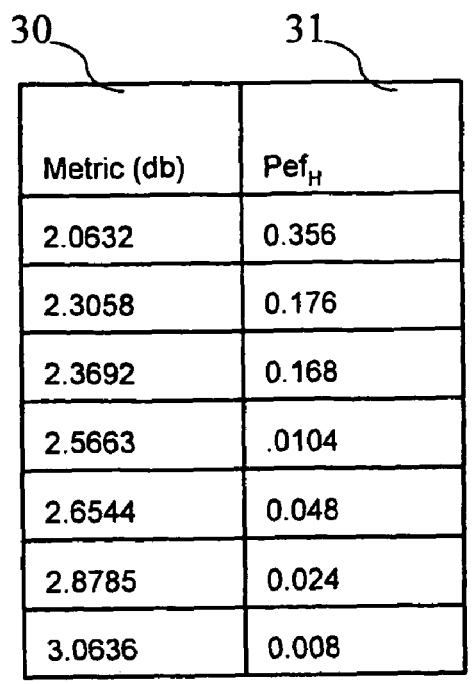
FIG. 3 is an example of a first table memorized either in mobile stations or base station in a wireless communication system.
Figure 4:
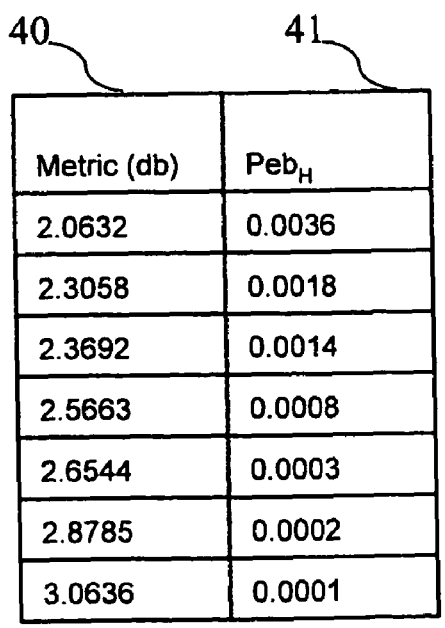
FIG. 4 is an example of another table memorized either in mobile stations or base station in a wireless communication system.

It has to be noted here that instead of using a table as shown in FIG. 3 or in FIG. 4, the calculation unit 114 or the decision engine 164 calculates the error probability from a formula obtained from values given in the FIG. 3.

It has to be noted also here that, in a variant of realization, the mean and the at least one moment of an order strictly upper than one are the set of moments that accurately describe the geometric mean of the signal to interference plus noise ratios.

Figure 1B:
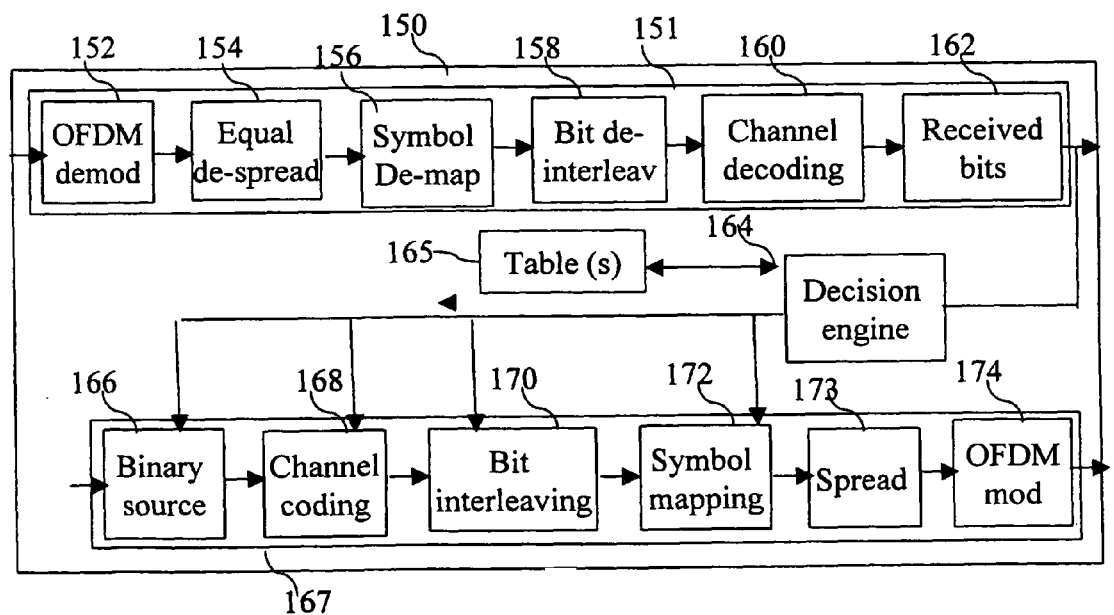
FIG. 1b is a block diagram of a base station in a wireless communication system according to the present invention in a particular case where the modulation scheme is OFDM combined with CDMA as a multiple access scheme.

FIG. 1b is a block diagram of a base station in a wireless communication system according to the present invention in a particular case where the modulation scheme is OFDM combined with CDMA as a multiple access scheme.

The base station 150 is a terminal which uses an MC-CDMA modulation. The base station 150 can also implement the communication technologies mentioned above. It has to be noted here that, the present invention is described in the case of a centralized network wherein a plurality of mobile stations communicate with each other through a base station. Naturally, the present invention is also implemented in a distributed network wherein mobile stations communicate directly with each other.

The base station 150 is in communication through radio channels with a plurality of mobile terminals as described in FIG. 1a. The base station 150 comprises a reception unit 151, a transmission unit 167 and a decision engine 165.

The reception unit 151 comprises an OFDM demodulator 152, an equalization module 154, a symbol de-mapping unit 156, a bit de-interleaving unit 158, a channel decoding unit 160 which produce binary data 162 which are processed by the base station 150. In the present example, the equalization module 154 is also able to de-spread the symbols if they have been spread prior to the transmission of the data frame.

The OFDM demodulator 152, the equalization module 154, the symbol de-mapping unit 156, the bit de-interleaving unit 158 and the channel decoding unit 160 are classical, they will not be described anymore.

The transmission unit 167 comprises a channel coding unit 168, a bit interleaving unit 170, a symbol mapping unit 172, a spreading unit 173 and an OFDM modulator 174 which transform binary data 166 to be transmitted on radio communication channels to mobile terminals 100. The channel coding unit 168, the bit interleaving unit 170, the symbol mapping unit 172, the spreading unit 173 and the OFDM modulator 174 are classical, they will not be described anymore.

It has to be noted here that in some other examples of realisation, the transmission unit 121 doesn't include a spreading unit 127.

The base station 150 comprises a decision engine 164. The decision engine 164 is composed of a processor and associated memory means. The processor and associated memory of the calculation unit are the same components as the ones used for controlling the Media Access Control layer of the transmission and/or reception protocol. The decision engine 164 is, in a variant, implemented in the form of a dedicated integrated circuit. In a preferred embodiment, the decision engine 164 performs so-called Link Adaptation according to the error probability received from mobile terminals 100, e.g it decides if binary data have to be transmitted again or not and/or if the channel coding has to be modified and/or if the modulation scheme has to be modified.

In a variant of realization, the decision engine 164 is associated with at least one look-up table as disclosed in the FIG. 3 or in the FIG. 4. The decision engine 164 comprises means for calculating metrics and an error probability according to the algorithm as described in reference to FIG. 2b from data received by mobile terminals 100.

FIG. 2a is an algorithm executed by a mobile terminal for determining metrics according to the present invention.

The code of this flow chart is for example stored in the ROM memory not shown in FIG. 1a associated to processor of the calculation unit 114 of a mobile terminal 100. When the mobile terminal 100 is powered up, the code is loaded into the random access memory of the calculation unit 114 and executed by the processor.

The algorithm of FIG. 2a is executed each time a frame is received by the mobile terminal 100.

The algorithm starts at step S300 by receiving a new frame from the base station 150. The frame received is then demodulated, an equalization or an equalization and a de-spreading is conducted and symbols are de-mapped into items of information so-called soft bits.

At step S301, the first soft bit obtained from the first symbol of the data frame is considered.

At next step S302, the signal to noise ratio of the considered soft bit obtained from one symbol of the data frame is calculated by the calculation unit 114.

For soft bit $s_i$, the $SINR_i$ is calculated as follows:

$$SINR_i = \frac{P_i}{(\sigma_v^2)_i + (\sigma_\alpha^2)_i}$$

Wherein $P_i$ is the useful power determined after the equalization or after the equalization and the de-spreading.

$\sigma_v^2$ is a value which represents the thermal noise power. Such value can be either calculated in real time or determined once for a receiving unit.

$\sigma_\alpha^2$ is the residual interference power coming from interference links after equalization and de-spreading.

It has to be noted here that the $SINR_i$ can also be obtained by the calculation unit 114 from the equalization module 104.

It has to be noted here that, instead of determining the $SINR_i$ for each soft bit, other parameters like the signal to noise ratio or the capacity of the equivalent communication channels in the sense of Shannon theory can be determined.

The $SINR_i$ calculated for the current soft bit in then stored into the associated memory of the calculation unit 114 at step S303.

At next step S304, the calculation unit checks whether or not the $SINR_i$ have been calculated for all soft bits obtained from all symbols of the received frame. If there is some remaining $SINR_i$ to be determined, the calculation unit 114 moves to step S304, considers the following soft bit obtained from the following symbol of the frame and moves to step S302. As far as a SINR has not been determined for each soft bit, the calculation unit 114 executes the loop made by steps S302 to S305.

Once a SINR has been calculated for all soft bits obtained from all symbols of the frame, the calculation unit 114 moves to step S306.

At that step, the calculation unit 114 calculates the mean of all the N $SINR_i$ determined for the received frame. The mean is calculated as follow:

$$m_{SINR} = \frac{1}{N}\sum_{i=1}^{N} SINR_i$$

Next, the calculation unit 114 moves to step S307 and calculates the variance of the N $SINR_i$ determined for the received frame. The variance is calculated as follow:

$$\sigma_{SINR}^2 = \frac{1}{N}\sum_{i=1}^{N} SINR_i^2 - (m_{SINR})^2$$

Next, the calculation unit 114 moves to step S308 and calculates a first intermediate parameter noted m. The parameter m is calculated as follow:

$$m = \left(d^2 \cdot m_{SINR}^2 - \frac{d}{2}\sigma_{SINR}^2\right)^{1/4}$$

Next, the calculation unit 114 moves to step S309 and calculates a second intermediate parameter noted $\sigma^2$. The parameter $\sigma^2$ is calculated as follow:

$$\rho^2 = d \cdot m_{SINR} - \sqrt{d^2 \cdot m_{SINR}^2 - d \cdot \sigma_{SINR}^2/2}$$

Next the calculation unit 114 moves to S310 and calculates the metric according to the invention noted $m_d$. The metric $m_d$ is calculated as follow:

$$m_d = \frac{m^2}{1+\sigma^2} + \log(1+\sigma^2)$$

Next, the calculation unit 114 moves to step S311 and reads the table as shown in FIG. 3 or in FIG. 4 and obtains a corresponding error probability like a Probability of frame error for a channel realisation H noted $Pef_H$ using the metric as a key. It has to be noted here that instead of obtaining a corresponding $Pef_H$, a Probability of bit error for a channel realisation H noted $Peb_H$ can also be obtained by addressing the table for $Peb_H$ as the one shown in FIG. 4.

Next, the calculation unit moves to step S312 and transfers the obtained $Pef_H$ and/or $Peb_H$ to the channel coding module 122 of the transmitting unit 121. The $Pef_H$ and/or $Peb_H$ are then transmitted to the base station 150 with the other binary data 120 to be transmitted.

It has to be noted here that according to a variant, the calculation unit 114 doesn't execute the step S308 to S311 and $m_{SINR}$ and $\sigma_{SINR}$ are transferred at step S312 instead of the obtained $Pef_H$ and/or $Peb_H$.

According to another variant the calculation unit 114 doesn't execute the step S310 to S311 and m and $\sigma^2$ are transferred at step S312 instead of the obtained $Pef_H$ and/or $Peb_H$.

Such variants avoid the necessity of storing tables like the one shown in FIG. 3.

Once the step S312 has been executed, the calculation unit 114 returns to step S300 and waits for another received frame in order to treat it as previously described.

FIG. 2b is an algorithm executed by a base station for obtaining a metric and/or deciding any modification of the modulation and the coding according to the determined error probability.

The code of this flow chart is for example stored in the ROM memory not shown in FIG. 1b associated to processor of the decision engine 164 of the base station 150. When the base station 150 is powered up, the code is loaded into the random access memory of the decision engine and executed by the processor.

The algorithm of FIG. 2b is executed each time a frame is received by the base station 150.

The algorithm starts at step S320 by receiving a new frame from a mobile station 100. The frame received is then demodulated, an equalization is conducted, symbols are de-mapped into soft bits, de-interleaved and decoded into received bits 162. In the present example, the equalization module 154 is also able to de-spread the symbols if they have been spread prior to the transmission of the data frame.

At step S321, the decision engine 164 extracts data from the received bits 162. These data are the $Pef_H$ and/or $Peb_H$ transferred by the mobile station 100 at step S312 of the algorithm of the FIG. 2a.

According to a variant, the data are the intermediate parameters m and $\sigma^2$ calculated at step S308 and S309 of the algorithm of the FIG. 2a. In such case the decision engine 164 calculates the metric $m_d$ as it is disclosed at step S310 of the algorithm of the FIG. 2a.

According to another variant, the data are $m_{SINR}$ and $\sigma_{SINR}$ calculated at step S306 and S307 of the algorithm of the FIG. 2a. In such case the decision engine 164 calculates the intermediate parameters m and $\sigma^2$ and the metric $m_d$ as it is disclosed at step S308, S309 and S310 of the algorithm of the FIG. 2a.

At the following step S322, the decision engine 164 reads the table 165 as shown in FIG. 3 and obtains a corresponding $Pef_H$ using the metric $m_d$ as a key. It has to be noted here that instead of obtaining a corresponding $Pef_H$, a $Peb_H$ can also be obtained by addressing the table for $Peb_H$ as the one shown in FIG. 4.

It has to be noted here that if the $Pef_H$ and/or $Peb_H$ have been transmitted in the received frame, the step S322 is not executed.

Next the decision engine 164 moves to step S323 and decides, according to the error probabilities $Pef_H$ and/or $Peb_H$ previously obtained, if binary data have to be transmitted again or not and/or if the channel coding has to be modified and/or if the modulation scheme has to be modified.

Once step S324 is executed, the decision engine 164 returns to step S320 and waits the reception of a new data frame.

It has to be noted here that instead of using a table as shown in FIG. 3, the calculation unit 114 or the decision engine 164 calculates the error probability from a formula obtained from values given in the FIG. 3.

FIG. 3 is an example of a first table memorized either in mobile stations or base station in a wireless communication system.

The table of the FIG. 3 is constituted of two columns 30 and 31. The table of the FIG. 3 is obtained by simulation and/or experimental analysis.

The column 30 comprises different values in decibels of the metric $m_d$, the column 31 comprises values of the Probability of frame error for a channel realisation H $Pef_H$.

FIG. 4 is an example of another table memorized either in mobile stations or base station in a wireless communication system.

The table of the FIG. 4 is constituted of two columns 40 and 41. The table of the FIG. 4 is obtained by simulation and/or experimental analysis.

The column 40 comprises different values in decibels of the metric $m_d$, the column 41 comprises values of the Probability of bit error for a channel realisation H $Peb_H$.

Naturally, many modifications can be made to the embodiments of the invention described above without departing from the scope of the present invention.

The invention claimed is:

1. A method of determining a metric for evaluating an error probability of a data frame comprising:
   receiving, at a radio receiving device, the data frame encoded according to a coding method and transmitted through a radio communication channel by a radio transmitting device, the data frame comprising a plurality of symbols;
   performing a channel equalization of the data frame received at the radio receiving device to produce a channel equalized data frame;
   performing a symbol de-mapping of symbols in the channel equalized data frame to produce a de-mapped data frame;
   obtaining soft bits based on the de-mapped data frame and characteristics of the coding method;
   calculating at least one intermediate value from a calculated mean and a calculated variance of a signal to interference plus noise ratios of the soft bits; and
   calculating a metric for evaluating the error probability of the data frame from the at least one intermediate value, the intermediate value having an order of two or greater and representing an equivalent communication channel for the soft bits, wherein
   evaluating the error probability includes consulting a table comprising different error probability values respectively associated to values of the metric, and
   the error probability includes a probability of frame error for a channel realization.

2. The method according to claim 1, wherein:
   the data frame is modulated according to an OFDM modulation;
   the equivalent communication channel comprises the OFDM modulation, the physical radio channel, an OFDM demodulation, and the channel equalization when the transmitting the data frame from the radio transmitting device includes using a single transmitting antenna, and receiving the data frame at the radio receiving device includes using a single receiving antenna; and
   the equivalent communication channel comprises at least one of a space time, a frequency, and a space time and frequency coding as an adapted channel equalization to a coded Multiple Input Multiple Output transmission, the OFDM modulation, the physical radio channel, and the OFDM demodulation, when at least one of the radio transmitting device and the radio receiving device has plural antennas.

3. The method according to claim 1, wherein:
   the intermediate value represents the equivalent communication channel for the soft bits includes signal to interference plus noise ratios of all soft bits obtained from all symbols in the data frame.

4. The method according to claim 3, further comprising:
   calculating a mean of the signal to interference plus noise ratios;
   calculating a variance of the signal to interference plus noise ratios, as the at least one moment of an order greater than one; and
   calculating the metric from at least the calculated mean and the calculated variance.

5. The method according to claim 4, further comprising:
   determining a first intermediate value $$m = \left(d^2 \cdot m_{SINR}^2 - \frac{d}{2}\sigma_{SINR}^2\right)^{1/4}$$

wherein $m_{SINR}$ is the calculated mean calculated for all the soft bits obtained from all symbols of the data frame, $\sigma_{SINR}^2$ is the calculated variance calculated for all the soft bits obtained from all symbols of the data frame, and d is a minimum distance separating two codewords in the coding method;
   determining a second intermediate value $$\rho^2 = d \cdot m_{SINR} - \sqrt{d^2 \cdot m_{SINR}^2 - d \cdot \sigma_{SINR}^2/2}; \text{ and}$$

determining the metric $$m_d = \frac{m^2}{1+\sigma^2} + \log(1+\sigma^2).$$

6. The method according to claim 1, wherein the calculating is executed by the radio receiving device and the method further comprises:
   transferring, to the radio transmitting device, data comprising an evaluated error probability, a calculated metric, the intermediate values, or the calculated mean and the calculated variance.

7. The method according to claim 1, wherein the performing the channel equalization further comprises performing a de-spreading of the data frame, and the channel equalized data frame includes a channel equalized de-spread data frame.

8. A device for determining a metric for evaluating an error probability of a data frame, the device comprising;
   a receiving section configured to receive the data frame encoded according to a coding method and transmitted through a radio communication channel by a radio transmitting device, the data frame comprising a plurality of symbols;
   a channel equalization section configured to perform channel equalization of the received data frame to produce a channel equalized data frame;

a symbol de-mapping section configured to perform symbol de-mapping of symbols in the channel equalized data frame to produce a de-mapped data frame, an obtaining section configured to obtain soft bit based on the de-mapped data frame and from characteristics of the coding method;

an intermediate value calculating section to calculate at least one intermediate value from a calculated mean and a calculated variance of a signal to interference plus noise ratios of the soft bits;

a metric calculating section to calculate a metric for evaluating the error probability of the data frame from the at least one intermediate value, the intermediate value having an order of two or greater and representing an equivalent communication channel for the soft bits; and an evaluating section configured to evaluate the error probability by consulting a table comprising different error probability values respectively associated to values of the metric, the error probability including a probability of frame error for a channel realization.

9. The device according to claim 8, wherein:

the receiving section is further configured to receive the data frame transmitted using an OFDM modulation of the data frame;

the equivalent communication channel comprises the OFDM modulation, the physical radio channel, an OFDM demodulation, and the channel equalization when the radio transmitting device transmits the data frame using a single transmitting antenna, and the receiving section includes a single receiving antenna used to receive the data frame; and the equivalent communication channel comprises at least one of a space time, a frequency, and a space time and frequency coding as an adapted channel equalization to a coded Multiple Input Multiple Output transmission, the OFDM modulation, the physical radio channel, and the OFDM demodulation, when at least one of radio transmitting device and the receiving section has plural antennas.

10. The device according to claim 9, wherein:

the intermediate value represents the equivalent communication channel for the soft bits include signal to interference plus noise ratios of all soft bits obtained from all symbols in the data frame.

11. The device according to claim 10, further comprising:

a mean calculating section configured to calculate a mean of the signal to interference plus noise ratios;

a variance calculating section configured to calculate a variance of the signal to interference plus noise ratios, as the at least one moment of an order greater than one; and the calculating unit is further configured to calculate the metric from at least the calculated mean and the calculated variance.

12. The device according to claim 8, wherein the channel equalization section is further configured to perform de-spreading of the received data frame, and the channel equalized data frame includes a channel equalized de-spread data frame.

13. A processing device storing processor instructions which when executed by a processor cause the processor to perform a method of determining a metric for evaluating an error probability of a data frame comprising:

controlling a receiving, at a radio receiving device, of the data frame encoded according to a coding method and transmitted through a radio communication channel by a radio transmitting device, the data frame comprising a plurality of symbols;

performing a channel equalization of the data frame received at the radio receiving device to produce a channel equalized data frame;

performing a symbol de-mapping of symbols in the channel equalized data frame to produce a de-mapped data frame;

obtaining soft bits based on the de-mapped data frame and characteristics of the coding method;

calculating at least one intermediate value from a calculated mean and a calculated variance of a signal to interference plus noise ratios of the soft bits; and calculating a metric for evaluating the error probability of the data frame from the at least one intermediate value, the intermediate value having an order of two or greater and representing an equivalent communication channel for the soft bits, wherein evaluating the error probability includes consulting a table comprising different error probability values respectively associated to values of the metric, and the error probability includes a probability of frame error for a channel realization.

* * * * *